US009689735B2

(12) United States Patent
Pankratz et al.

(10) Patent No.: US 9,689,735 B2
(45) Date of Patent: Jun. 27, 2017

(54) VIBRATORY FLOWMETER FRICTION COMPENSATION

(75) Inventors: Anthony William Pankratz, Arvada, CO (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 709 days.

(21) Appl. No.: 13/509,870

(22) PCT Filed: Dec. 1, 2009

(86) PCT No.: PCT/US2009/066171
§ 371 (c)(1),
(2), (4) Date: May 15, 2012

(87) PCT Pub. No.: WO2011/068500
PCT Pub. Date: Jun. 9, 2011

(65) Prior Publication Data
US 2012/0232811 A1    Sep. 13, 2012

(51) Int. Cl.
*G01F 1/66*    (2006.01)
*G06F 19/00*    (2011.01)
(Continued)

(52) U.S. Cl.
CPC ........ *G01F 25/0007* (2013.01); *G01F 1/8436* (2013.01); *G01F 1/8477* (2013.01)

(58) Field of Classification Search
CPC ........ G01F 1/36; G01F 1/8436; G01F 1/8477; G01F 25/007; G01F 15/024
(Continued)

(56) References Cited

U.S. PATENT DOCUMENTS 4,067,238 A * 1/1978 Oetiker ...................... 73/861.73
4,711,132 A * 12/1987 Dahlin ...................... 73/861.356
(Continued)

FOREIGN PATENT DOCUMENTS

| EP | 1659377 A1 | 5/2006 |
| WO | 0036379 A1 | 6/2000 |
| WO | 2009134268 A1 | 11/2009 |

OTHER PUBLICATIONS

Martorano, Scott: "Calulating Friction Loss: Darcy-Weisbach Formula vs. Hazen-Williams" Mar. 30, 2006, pp. 1-8, XPOO2577065 Retrieved from the Internet: URL:http://www.pdfone.com/download/0_keyword-friction-loss-darcy/technical-article.pdf>.

*Primary Examiner* — Carol S Tsai
(74) *Attorney, Agent, or Firm* — The Ollila Law Group LLC

(57) ABSTRACT

The invention relates to meter electronics (20) for vibratory flowmeter friction compensation is provided. The meter electronics (20) includes an interface (201) configured to communicate with a flowmeter assembly (10) of a vibratory flowmeter (5) and receive a vibrational response and a processing system (203) coupled to the interface (201) and configured to measure a mass flow rate of a fluid using the vibrational response. The processing system (203) is configured to determine a fluid velocity (V) using the mass flow rate, a fluid density (ρ), and a cross-sectional flow area (A), determine a friction factor (f) using the fluid velocity (V) and a pressure drop (ΔP), and determine a compensation factor using the friction factor (f). The invention also relates to a vibratory flowmeter compensation method.

16 Claims, 6 Drawing Sheets

(51) Int. Cl.
*G01F 25/00* (2006.01)
*G01F 1/84* (2006.01)

(58) Field of Classification Search
USPC ..... 73/61.43, 61.44, 861.04, 861.83, 861.03; 702/47
See application file for complete search history.

(56) References Cited

U.S. PATENT DOCUMENTS

| | | | |
|---|---|---|---|
| 4,821,564 A * | 4/1989 | Pearson | E21B 43/26 73/152.31 |
| 4,823,614 A * | 4/1989 | Dahlin | 73/861.357 |
| 5,635,650 A * | 6/1997 | Ito | 73/861.21 |
| 5,661,232 A | 8/1997 | Van Cleve et al. | |
| 5,861,561 A | 1/1999 | Van Cleve et al. | |
| 5,970,802 A * | 10/1999 | Strubbe | 73/861.73 |
| 6,513,393 B1 | 2/2003 | Eckert et al. | |
| 7,134,348 B2 | 11/2006 | Kolahi | |
| 8,826,745 B2 * | 9/2014 | Van Cleve | 73/861.357 |

* cited by examiner

VIBRATORY FLOWMETER FRICTION COMPENSATION

BACKGROUND OF THE INVENTION

1. Field of the Invention

The present invention relates to a vibratory flowmeter, and more particularly, to a vibratory flowmeter friction compensation.

2. Statement of the Problem

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things. Vibratory flowmeters, including Coriolis mass flowmeters and densitometers, therefore employ one or more flow conduits that are vibrated in order to measure a fluid.

The accuracy and performance of a vibratory flowmeter can be affected by various factors, such as variations in fluid flow, changes in fluid composition, temperature, and other factors. One factor that is commonly neglected in the prior art is friction between the flow fluid and the walls of the flowmeter conduit or conduits. The friction effect, including boundary layer flow effects, can create turbulent flow. The friction effect and resulting turbulent flow can adversely affect flow measurements.

ASPECTS OF THE INVENTION

In one aspect of the invention, a meter electronics for vibratory flowmeter friction compensation comprises:
an interface configured to communicate with a flowmeter assembly of a vibratory flowmeter and receive a vibrational response; and
a processing system coupled to the interface and configured to measure a mass flow rate ($\dot{m}$) of a fluid using the vibrational response, with the processing system being characterized by being configured to determine a fluid velocity (V) using the mass flow rate ($\dot{m}$), a fluid density ($\rho$), and a cross-sectional flow area (A), determine a friction factor (f) using the fluid velocity (V) and a pressure drop ($\Delta P$), and determine a compensation factor using the friction factor (f).

Preferably, the meter electronics receives the fluid density ($\rho$).

Preferably, the vibratory flowmeter measures the fluid density ($\rho$).

Preferably, the meter electronics receives the pressure drop ($\Delta P$).

Preferably, the vibratory flowmeter measures the pressure drop ($\Delta P$).

Preferably, with the processing system being further configured to generate a friction-compensated mass flow rate ($\dot{m}_{comp}$).

Preferably, with the processing system being further configured to generate a friction-compensated volume flow rate ($\dot{v}_{comp}$).

Preferably, determining the compensation factor comprises correlating the friction factor (f) to empirically-derived data.

In one aspect of the invention, a vibratory flowmeter friction compensation method comprises:
measuring a mass flow rate ($\dot{m}$) of a fluid using a vibratory flowmeter;
determining a fluid velocity (V) using the mass flow rate ($\dot{m}$), a fluid density ($\rho$), and a cross-sectional flow area (A);
determining a friction factor (f) using the fluid velocity (V) and a pressure drop ($\Delta P$); and
determining a compensation factor using the friction factor (f).

Preferably, a meter electronics of the vibratory flowmeter receives the fluid density ($\rho$).

Preferably, the vibratory flowmeter measures the fluid density ($\rho$).

Preferably, a meter electronics of the vibratory flowmeter receives the pressure drop ($\Delta P$).

Preferably, the vibratory flowmeter measures the pressure drop ($\Delta P$).

Preferably, further comprising generating a friction-compensated mass flow rate ($\dot{m}_{comp}$).

Preferably, further comprising generating a friction-compensated volume flow rate ($\dot{v}_{comp}$).

Preferably, determining the compensation factor comprises correlating the friction factor (f) to empirically-derived data.

In one aspect of the invention, a vibratory flowmeter friction compensation method comprises:
measuring a mass flow rate ($\dot{m}$) of a fluid using a vibratory flowmeter;
measuring a fluid density ($\rho$) using the vibratory flowmeter;
determining a fluid velocity (V) using the mass flow rate ($\dot{m}$), the fluid density ($\rho$), and a cross-sectional flow area (A);
determining a friction factor (f) using the fluid velocity (V) and a pressure drop ($\Delta P$); and
determining a compensation factor using the friction factor (f).

Preferably, a meter electronics of the vibratory flowmeter receives the pressure drop ($\Delta P$).

Preferably, the vibratory flowmeter measures the pressure drop ($\Delta P$).

Preferably, further comprising generating a friction-compensated mass flow rate ($\dot{m}_{comp}$).

Preferably, further comprising generating a friction-compensated volume flow rate ($\dot{v}_{comp}$).

Preferably, determining the compensation factor comprises correlating the friction factor (f) to empirically-derived data.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
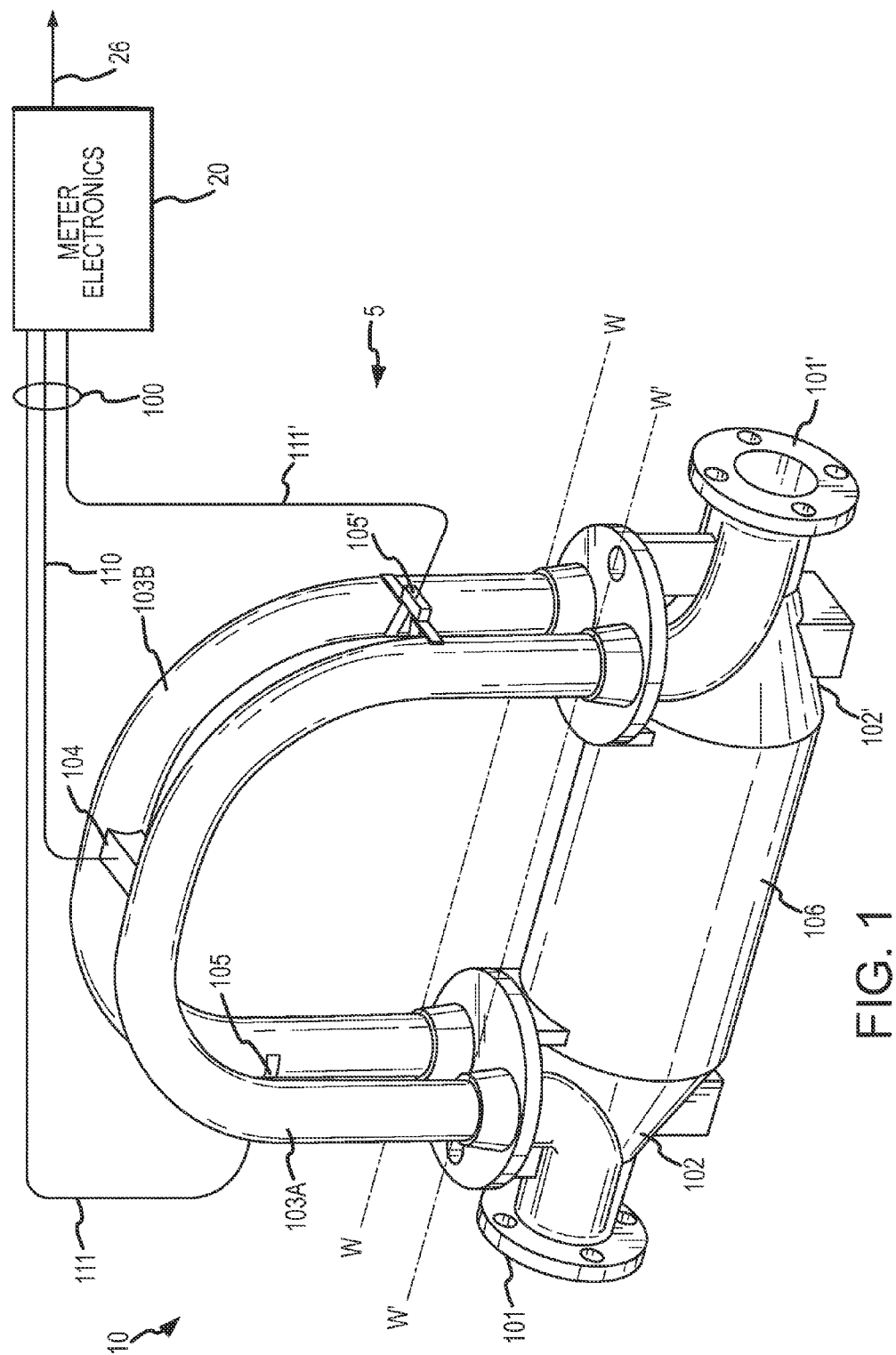
FIG. 1 shows a vibratory flowmeter according to the invention.

FIG. 1 shows a vibratory flowmeter 5 according to the invention. The vibratory flowmeter 5 comprises a flowmeter assembly 10 and meter electronics 20. The meter electronics 20 is connected to the meter assembly 10 via leads 100 and is configured to provide measurements of one or more of a density, mass flow rate, volume flow rate, totalized mass flow, temperature, or other measurements or information over a communication path 26. It should be apparent to those skilled in the art that the vibratory flowmeter can comprise any manner of vibratory flowmeter, regardless of the number of drivers, pick-off sensors, flow conduits, or the operating mode of vibration. The vibratory flowmeter 5 can comprise a Coriolis flowmeter. In addition, it should be recognized that the vibratory flowmeter 5 can comprise a vibratory densitometer.

The flowmeter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106 in some embodiments. The spacer 106 maintains the spacing between the manifolds 102 and 102' in order to prevent pipeline forces from being transmitted to flow conduits 103A and 103B. When the flowmeter assembly 10 is inserted into a pipeline (not shown) which carries the flow fluid being measured, the flow fluid enters the flowmeter assembly 10 through the flange 101, passes through the inlet manifold 102 where the total amount of flow fluid is directed to enter the flow conduits 103A and 103B, flows through the flow conduits 103A and 103B and back into the outlet manifold 102', where it exits the meter assembly 10 through the flange 101'.

The flow fluid can comprise a liquid. The flow fluid can comprise a gas. The flow fluid can comprise a multi-phase fluid, such as a liquid including entrained gases and/or entrained solids.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the vibratory flowmeter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110. Other driver devices are contemplated and are within the scope of the description and claims.

The meter electronics 20 receives sensor signals on the leads 111 and 111', respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105 and 105' in order to compute a flow rate, among other things The communication path 26 provides an input and an output means that allows the meter electronics 20 to interface with an operator or with other electronic systems. The description of FIG. 1 is provided merely as an example of the operation of a vibratory flowmeter 5 and is not intended to limit the teaching of the present invention.

The meter electronics 20 in one embodiment is configured to vibrate the flow conduits 103A and 103B. The vibration is performed by the driver 104. The meter electronics 20 further receives resulting vibrational signals from the pickoff sensors 105 and 105'. The vibrational signals comprise a vibrational response of the flow conduits 103A and 103B. The meter electronics 20 processes the vibrational response and determines a response frequency and/or phase difference. The meter electronics 20 processes the vibrational response and determines one or more flow measurements, including a mass flow rate and/or density of the flow fluid. Other vibrational response characteristics and/or flow measurements are contemplated and are within the scope of the description and claims.

In one embodiment, the flow conduits 103A and 103B comprise substantially U-shaped flow conduits, as shown. Alternatively, in other embodiments, the flow conduits can comprise substantially straight flow conduits. Additional flowmeter shapes and/or configurations can be used and are within the scope of the description and claims.

The figure does not show pressure sensors or pressure sensor taps. It should be understood that in some embodiments, the vibratory flowmeter 5 includes pressure sensors for measuring a pressure drop substantially across the vibratory flowmeter 5. Alternatively, the meter electronics 20 may be configured to receive pressure values (or a pressure drop value ($\Delta P$)) from external sources, including from other devices or from an operator or technician. In another alternative, the vibratory flowmeter 5 can directly measure the pressure drop $\Delta P$, such as using the measured frequency and phase shift. For example, the vibratory flowmeter can employ the pressure determinations as disclosed in U.S. Pat. No. 7,597,008 and 5,734,112, commonly owned by the present assignee.

Head loss ($h_l$) is commonly defined as a loss in pressure in an incompressible fluid over a conduit span or across a component of a fluid-handling system. The measurement performance of a vibratory flowmeter can be improved if the head loss across the meter (or along a known section of pipeline including a flowmeter) can be measured and the flow rate measurements are subsequently compensated for flow mass and/or flow volume losses due to the physics of friction along the conduit wall. The friction factor is calculated from the Darcy-Weisbach equation in some embodiments and is found to correlate predictably with mass flow error and volume flow error. The errors can be compensated for, and as a result more accurate measurements can be achieved.

The Darcy-Weisbach equation has long been used to empirically quantify head loss ($h_l$) along a length (l) of pipe or conduit. The equation comprises:

$$h_l = f \frac{l}{D} \frac{V^2}{2g} \quad (1)$$

The (f) term is a friction factor, the (l) term is a length of the pipe, the (D) term is a diameter of the pipe, the (V) term is an average velocity, and the (g) term is a gravitational constant.

It should be understood that head loss ($h_l$) can be determined in other ways. For example, head loss ($h_l$) can be related to a measureable quantity, i.e., it can be related to a pressure drop ($\Delta P$) by the following equation.

$$h_l = \frac{\Delta P}{\gamma} \quad (2)$$

The ($\Delta P$) term is the pressure drop across the meter or pipe section and the ($\gamma$) term is the specific weight of the fluid, found by multiplying density by the gravitational constant (e.g., $\gamma = \rho g$).

The friction factor (f) can be empirically obtained from experimental data for flow along a straight pipe. The friction factor (f) can be empirically obtained for various conditions or combinations of conditions, including flow conduit material, flow conduit roughness, flow fluid type, flow pressure, and/or flow temperature, for example. Other conditions are contemplated and are within the scope of the description and claims.

While flowmeter geometry is sometimes much more complicated than a simple straight pipe, it has been found that a unique relationship exists between the friction factor W and the pressure drop ($\Delta P$) for a particular meter. Because the geometry of a particular meter never changes, experimental data can be generated relating friction factor (f) to head loss ($h_1$) over the full range of fluid conditions expected during operation, thereby relating the friction factor (f) to operating conditions of the vibratory flowmeter and the flow material.

The Darcy-Weisbach equation can be re-arranged as:

$$f = h_l \frac{D}{l} \frac{2g}{V^2} \quad (3)$$

This form of the equation will allow for substitution of equation (2) into the newly arranged equation (3) in order to eliminate the head loss ($h_l$)) term. This enables the solution for the friction factor (f) using only measureable or known quantities.

$$f = \Delta P \frac{D}{l} \frac{2}{\rho V^2} \quad (4)$$

It should be understood that equation (4) can be simplified or modified for purposes of obtaining measurements and computing a resulting friction factor (f).

The meter conduit or pipeline diameter (D) and the length (l) are typically known in advance. Vibratory flowmeters, such as Coriolis mass flow meters and densitometers, commonly measure mass flow rate, density, and temperature. The pressure drop ($\Delta P$) may be independently measured or may be measured by a vibratory flowmeter (discussed below). Mass flow rate ($\dot{m}$) is defined as follows for a flowing conduit:

$$\dot{m} = \rho A V \quad (5)$$

Where the ($\rho$) term is the fluid density, the (A) term is internal cross-sectional flow area of the flow meter, and the (V) term is the average fluid velocity. Thus, the average velocity (V) can be determined from:

$$V = \frac{\dot{m}}{\rho A} \quad (6)$$

The above embodiment of the equation applies to the use of a pipeline diameter. Where the flow conduit diameter is to be used for calculating A, the mass flow rate term ($\dot{m}$) may need to be divided by two. It should be understood that equation (6) may need to be otherwise changed or adjusted depending on the cross-sectional area being used.

The cross sectional area (A) is the cross-sectional area of the flow conduits, which yields the velocity in the flow conduits. The pressure drop will be across the meter, which includes manifolds flanges and some small section of the pipeline. So the conduit velocity is used with a pressure drop of the full meter to calculate the friction factor. This comprises calculating an equivalent pressure drop for a single flow conduit.

This also could be done using the diameter of the manifold inlet instead of the flow conduit diameter. The internal cross sectional area can be determined many different ways, flow conduit D, manifold D, pipeline diameter. These are just scalar values and will not change the effectiveness of the correction.

Figure 2:
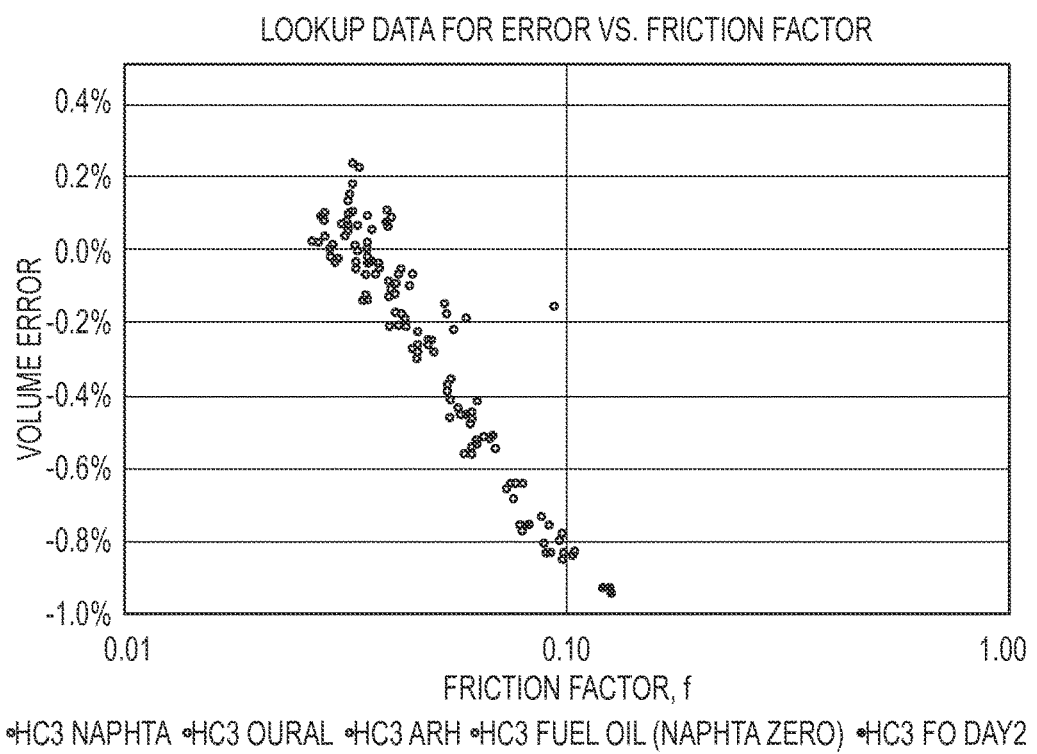
FIG. 2 shows a graph of determined volume error (volume flow rate error) versus friction factor (f) for a range of hydrocarbon fluids.

FIG. 2 shows a graph of determined friction factor (f) versus volume error (i.e., volume flow rate error) for a range of hydrocarbon fluids. It can be seen from the graph that the relationship between volume error and friction factor (f) can be represented by a single curve. In some cases, a logarithmic curve fit may work quite well. The graph may be used to generate a volume error factor from an operationally determined friction factor (f). Subsequently, the volume error factor can be applied to a measured volume flow rate measurement in order to correct or improve the volume flow rate measurement.

Figure 3:
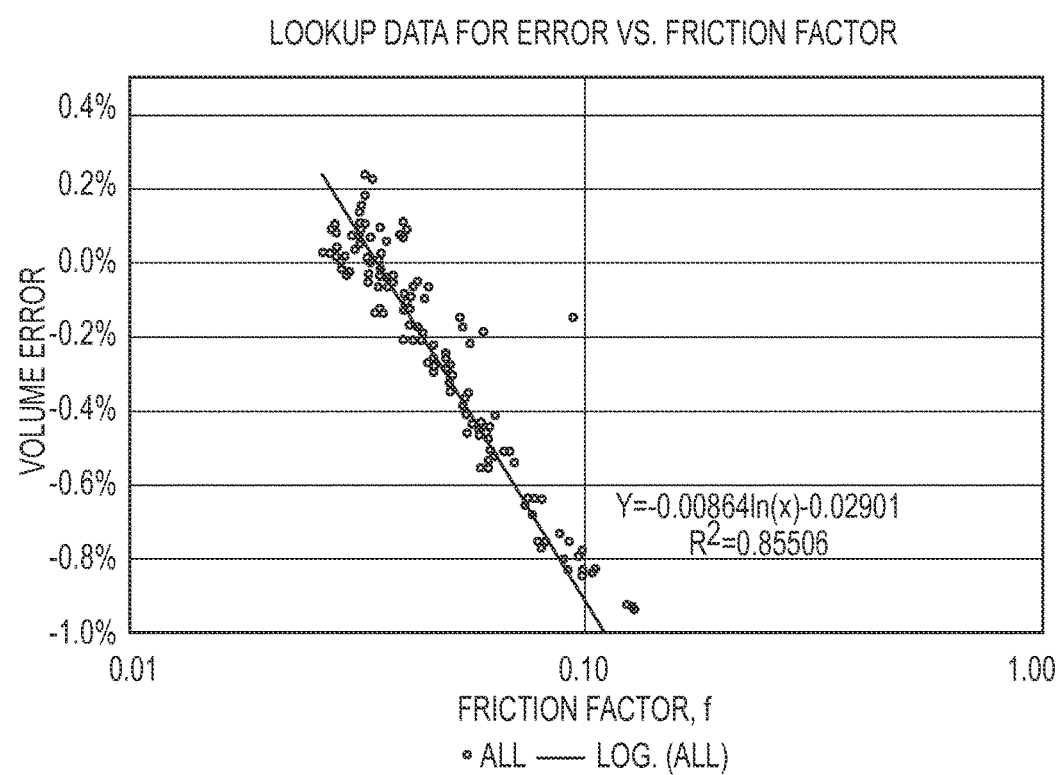
FIG. 3 shows the same graph but with a fitted curve that can be used to generate a volume error factor from an obtained flowmeter friction factor (f).

A wide range of hydrocarbons were used to generate the graph, from very light naptha to very heavy fuel oil (FO). A single model of flowmeter was used to obtain the data. It should be understood that a similar graph (or other data structure) can be formed, correlating the friction factor (f) to a mass error (i.e., mass flow rate error). FIG. 3 shows the same graph but with a fitted curve that can be used to generate a volume error factor from an obtained flowmeter friction factor (f). Such a curve may be stored in a data structure, such as an equation, table, or other representation, in order to simply and efficiently obtain a compensation factor from the determined friction factor W. The graph shows that it is not necessary to compensate for errors when the fluid has a friction factor (f) that is less than about 0.04 (on the horizontal axis) for the particular meter. Below that threshold, the errors are negligible and/or inconclusive, considering the reference system uncertainties of about +/−0.2%.

Figure 4:
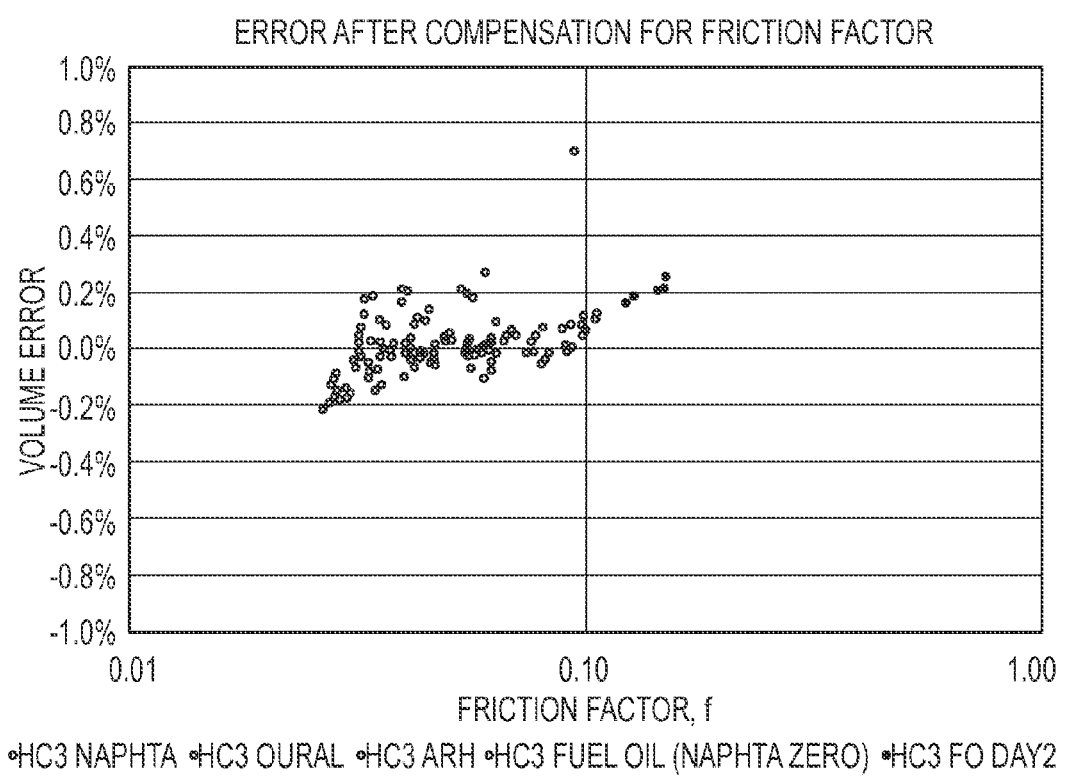
FIG. 4 shows a graph of resulting flow errors after compensation.

FIG. 4 shows a graph of resulting friction factors (f) after compensation. The result of the compensation is that the volume error is now on the order of +/−0.2%. This is an order of magnitude improvement in performance over the non-compensated data.

Figure 5:
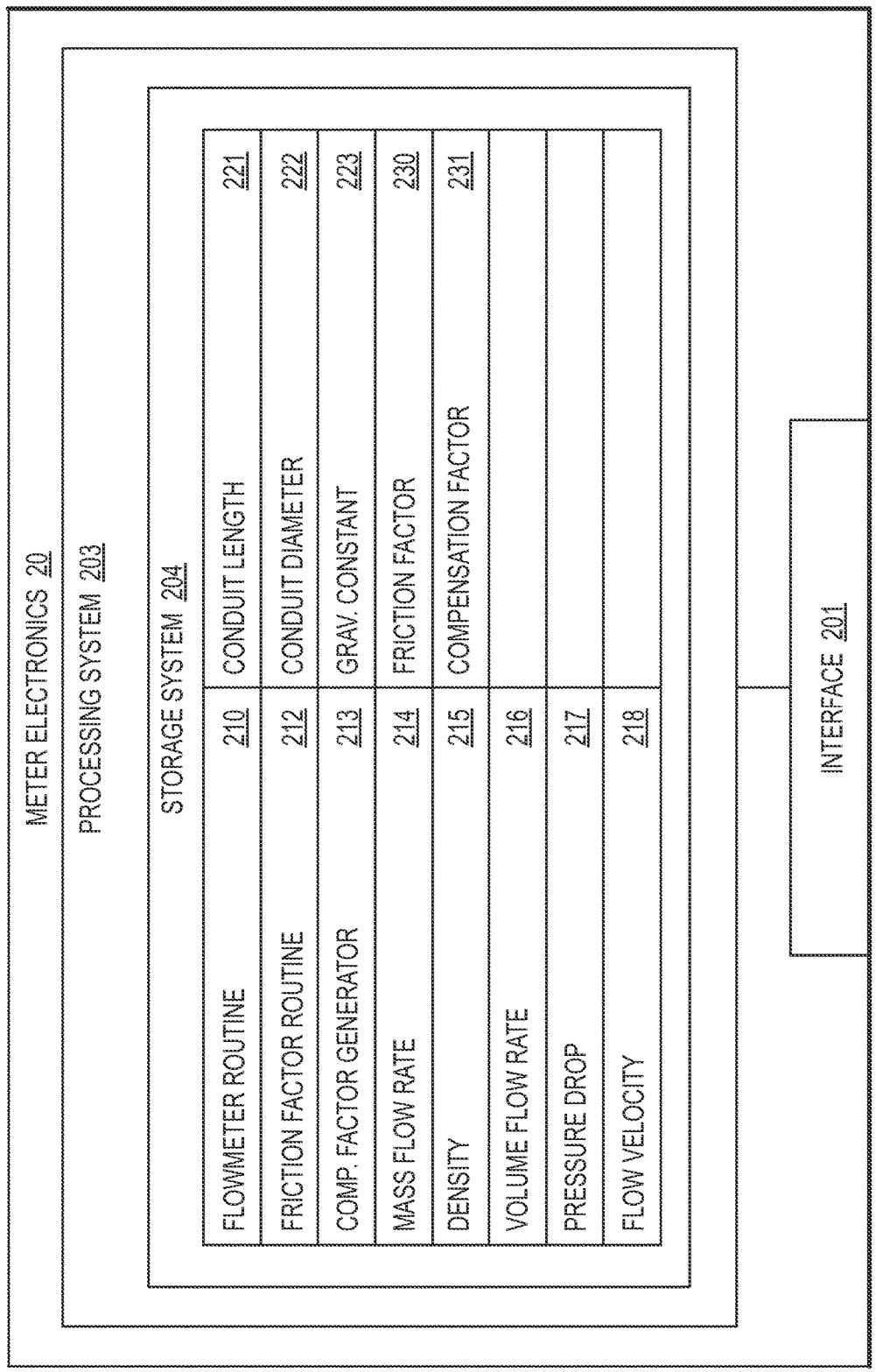
FIG. 5 is a block diagram of the meter electronics of the vibratory flowmeter according to the invention.

FIG. 5 is a block diagram of the meter electronics 20 of the vibratory flowmeter 5 according to the invention. The meter electronics 20 is configured to perform friction compensation for the vibratory flowmeter 5. The friction compensation can compensate for errors generated by friction between the flow fluid and an inner conduit surface of the vibratory flowmeter 5.

The vibratory flowmeter 5 can measure a mass flow rate and/or a volume flow rate of the fluid flow, or other fluid characteristics. The fluid characteristics can be monitored, recorded, and totaled. In addition, the measurement values can be compensated for friction. Resulting friction-compensated mass and volume flow rates can be produced, stored, and/or communicated to external devices, for example.

The meter electronics 20 includes an interface 201, a processing system 203 in communication with the interface 201, and a storage system 204 in communication with the processing system 203. Although these components are shown as distinct blocks, it should be understood that the meter electronics 20 can be comprised of various combinations of integrated and/or discrete components.

The interface 201 is configured to communicate with the flowmeter assembly 10 of the vibratory flowmeter 5. The interface 201 may be configured to couple to the leads 100 and exchange signals with the driver 104 and the pickoff sensors 105 and 105' (see FIG. 3). The interface 201 may be further configured to communicate over the communication path 26, such as to external devices.

The processing system 203 can comprise any manner of processing system. The processing system 203 is configured to retrieve and execute stored routines in order to operate the vibratory flowmeter 5. The storage system 204 can store routines including a flowmeter routine 210 and a friction factor routine 212. Other measurement and/or processing routines are contemplated and are within the scope of the description and claims.

The storage system 204 may store operating routines, including a flow meter routine 210 and a friction factor routine 212. The flow meter routine 210 may operate the vibratory flowmeter 5 and may generate measurement values, including mass flow rate and/or volume flow rate measurements, for example. The friction factor routine 212 in some embodiments determines a friction factor (f) and determines a compensation factor using the friction factor (f). Further, the friction factor routine 212 in some embodiments may perform a friction compensation on flowmeter measurements, producing friction-compensated flow rate measurements.

The storage system 204 can store measurements, received values, working values, and other information. In some embodiments, the storage system 204 stores a mass flow rate ($\dot{m}$) 214, a density ($\rho$) 215, a volume flow rate ($\dot{v}$) 216, a pressure drop ($\Delta P$) 217, and a flow velocity (V) 218.

The storage system 204 can store generated values, including a generated friction factor W 230 and a generated compensation factor 231.

The storage system 204 can store constants, known values, working values, data structures, and other items. In some embodiments, the storage system 204 stores a compensation factor generator 213, a conduit length 221, a conduit diameter 222, and a gravitational constant 223.

In operation, the meter electronics 20 is configured to measure a mass flow rate ($\dot{m}$) of a fluid using the vibratory flowmeter (5), i.e., by vibrating the flowmeter assembly (10) and processing a resulting vibrational response. The meter electronics 20 is configured to determine a fluid velocity (V) using the mass flow rate ($\dot{m}$), a fluid density ($\rho$), and a cross-sectional flow area (A). The determination can be accomplished by using equation (6), as previously discussed. The meter electronics 20 is configured to determine a friction factor (f) using the fluid velocity (V) and a pressure drop ($\Delta P$). The determination can be accomplished by using equation (4), as previously discussed. The meter electronics 20 is configured to determine a compensation factor using the friction factor W. Alternatively, the meter electronics 20 is configured to also measure the fluid density ($\rho$) in addition to measuring the fluid mass flow rate ($\dot{m}$).

The flow velocity can be determined from only the measured flow characteristics in some embodiments. In other embodiments, the flow velocity can be determined from a combination of measured flow characteristics and known/received values (discussed below).

Figure 6:
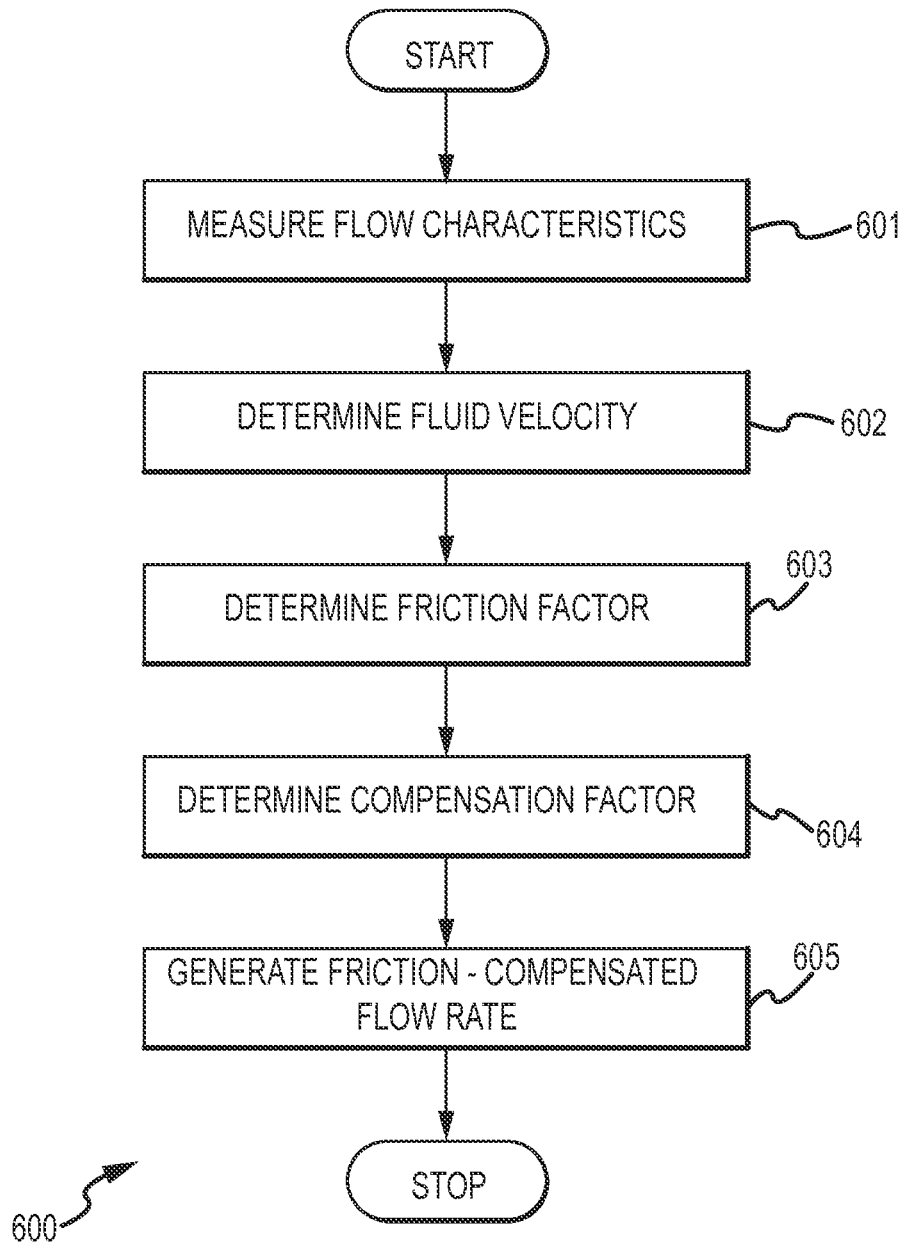
FIG. 6 is a flowchart of a friction compensation method for measuring a fluid flow rate according to the invention.

FIG. 6 is a flowchart 600 of a friction compensation method for measuring a fluid flow rate according to the invention. In step 601, the vibratory flowmeter is used to measure one or more flow characteristics. The one or more flow characteristics include at least a mass flow rate ($\dot{m}$) of a fluid flowing through the vibratory flowmeter. In addition, the vibratory flowmeter can be used to measure other fluid flow or fluid characteristics, including volume flow rate ($\dot{v}$), fluid density ($\rho$), pressure, and temperature, for example. The vibratory flowmeter can measure or generate a pressure drop ($\Delta P$) in some embodiments.

In step 602, a fluid velocity (V) is determined for the fluid flow. The fluid velocity (V) is determined using the measured mass flow rate ($\dot{m}$), a fluid density ($\rho$), and a cross-sectional flow area (A) of the vibratory flowmeter. The fluid velocity (V) in some embodiments comprises an average fluid velocity.

The fluid density ($\rho$) can be received in the meter electronics of the vibratory flowmeter, such as a value stored in the vibratory flowmeter that has been received from an operator or technician or from another device or meter. Alternatively, the fluid density (ρ) can be measured by the vibratory flowmeter.

In step 603, a friction factor W is determined using the fluid velocity (V) and a pressure drop (ΔP) across the vibratory flowmeter. In some embodiments, the friction factor (f) is determined using the fluid velocity (V), the measured pressure drop (ΔP), and known physical sizes and/or constants, as previously discussed. In some embodiments, the friction factor (f) is determined using the Darcy-Weisbach equation, equation (4) above, as previously discussed.

The pressure drop (ΔP) can be received in the meter electronics of the vibratory flowmeter, such as a value stored in the vibratory flowmeter that has been received from an operator or technician or from another device or meter. Alternatively, the pressure drop (ΔP) can be measured by the vibratory flowmeter, such as through pressure sensors located substantially at the inlet and outlet of the flowmeter and coupled to the meter electronics 20, for example. The inlet and outlet pressures can be used to derive or determine the pressure drop (ΔP) across the vibratory flowmeter. Yet in another method, the pressure drop (ΔP) can be directly measured by the vibratory flow meter by processing the conduit vibration signals. In some embodiments, the vibratory flow meter may be configured to derive or ascertain a pressure drop across the meter by determining a density of a known flow material.

In step 604, a compensation factor is determined using the friction factor (f). The compensation factor represents a flow rate error due to frictional losses. The determining correlates the friction factor (f) to empirically-derived data. The empirically-derived data may be specific to a fluid, flowmeter, and/or other factors. The compensation factor may be generated by inputting the friction factor (f) into a compensation factor generator, wherein the compensation factor generator comprises an appropriate data structure.

In some embodiments, the friction factor (f) is used to lookup error values for a given flowmeter from an appropriate data structure. The data structure can comprise, for example, a previously determined graph, table, curve, or equation that relates either a mass flow error to a friction factor (f) or relates a volume flow error to a friction factor (f). In some embodiments, only mass flow error versus friction factor (f) data is needed and the volume flow error may be determined from the mass flow error. This removes the need to provide volume flow error versus friction factor (f) data in addition to mass flow data.

The friction factor can also be used to compensate the temperature measurement and/or a viscosity measurement. The friction factor measures the boundary layer and the boundary layer is a key factor in the heat transfer properties of the fluid to the wall, thus the temperature measurement is effected by the friction (i.e., by the boundary layer).

In step 605, a flow rate measurement of the vibratory flowmeter is compensated using the compensation factor. The compensation factor can comprise a value obtained from the curve of FIG. 3, for example, wherein the curve is represented by an equation. A friction factor W in the form of an X-coordinate inputted into the curve equation will produce a correction factor, as seen in the Y-coordinate of the graph. The resulting compensation factor can comprise a positive or negative compensation term. The mass flow rate can be altered by the compensation factor to produce a friction-compensated mass flow rate ($\dot{m}_{comp}$).

A friction-compensated volume flow rate ($\dot{v}_{comp}$) can likewise be compensated using the determined compensation factor. Alternatively, the friction-compensated volume flow rate ($\dot{v}_{comp}$) may be derived by dividing the friction-compensated mass flow rate ($\dot{m}_{comp}$, by the fluid density (ρ).

What is claimed is:

1. A flowmeter for vibratory flowmeter friction compensation, comprising:
   an unrestricted flow tube configured to receive a process fluid therein;
   a driver in communication with the unrestricted flow tube configured to generate a vibratory signal through the unrestricted flow tube;
   at least one pickoff sensor with the unrestricted flow tube configured to detect a vibratory signal of the driver and generate a vibrational response;
   meter electronics comprising a portion of the vibratory flowmeter, being configured to receive the vibrational response and having a processing system coupled to an interface configured to communicate with the vibratory flowmeter and further configured to measure a mass flow rate ($\dot{m}$) of a fluid in the unrestricted flow tube using the vibrational response, with the processing system being characterized by:
   the processing system being configured to determine a fluid velocity (V) using the mass flow rate ($\dot{m}$), a fluid density (ρ), and a cross-sectional flow area (A), determine a friction factor (f) using the fluid velocity (V), density (ρ), and a pressure drop (ΔP), and determine a compensation factor using the friction factor (f); and
   a pressure sensor in communication with the vibratory flowmeter configured to measure the pressure drop (ΔP) wherein the pressure sensor is separate from the at least one pickoff sensor;
   wherein the processing system is further configured to generate a friction-compensated mass flow rate ($\dot{m}_{comp}$) from the compensation factor.

2. The flowmeter of claim 1, further comprising the meter electronics receiving the fluid density (ρ).

3. The flowmeter of claim 1, further comprising the vibratory flowmeter measuring the fluid density (ρ).

4. The flowmeter of claim 1, further comprising the meter electronics receiving the pressure drop (ΔP).

5. The flowmeter of claim 1, with the processing system being further configured to generate a friction-compensated volume flow rate ($\dot{v}_{comp}$).

6. The flowmeter of claim 1, with determining the compensation factor comprising correlating the friction factor (f) to empirically-derived data.

7. A vibratory flowmeter friction compensation method, the method comprising:
   providing a vibratory flowmeter having meter electronics having a processing system coupled to an interface configured to communicate with the vibratory flowmeter;
   providing a unrestricted flow tube configured to receive a process fluid therein;
   providing a driver in communication with the unrestricted flow tube configured to generate a vibratory signal through the unrestricted flow tube;
   providing at least one pickoff sensor with the unrestricted flow tube configured to detect a vibratory signal of the driver and generate a vibrational response;
   measuring a mass flow rate ($\dot{m}$) of a fluid in the unrestricted flow tube using the vibratory flowmeter, with the method being characterized by:

determining a fluid velocity (V) using the mass flow rate ($\dot{m}$), a fluid density ($\rho$), and a cross-sectional flow area (A);

determining a friction factor (f) using the fluid velocity (V), density ($\rho$), and a pressure drop ($\Delta P$);

determining a compensation factor using the friction factor (f);

providing a pressure sensor in communication with the meter electronics, wherein the pressure sensor is separate from the at least one pickoff sensor;

measuring a pressure drop ($\Delta P$) with the pressure sensor; and generating a friction-compensated mass flow rate ($\dot{m}_{comp}$) from the compensation factor.

8. The method of claim 7, further comprising a meter electronics of the vibratory flowmeter receiving the fluid density ($\rho$).

9. The method of claim 7, further comprising the vibratory flowmeter measuring the fluid density ($\rho$).

10. The method of claim 7, further comprising a meter electronics of the vibratory flowmeter.

11. The method of claim 7, further comprising generating a friction-compensated volume flow rate ($\dot{V}_{comp}$).

12. The method of claim 7, with determining the compensation factor comprising correlating the friction factor (f) to empirically-derived data.

13. A vibratory flowmeter friction compensation method, the method comprising:

providing a vibratory flowmeter having at least one pickoff sensor and meter electronics having a processing system coupled to an interface configured to communicate with the vibratory flowmeter;

measuring a mass flow rate ($\dot{m}$) of a fluid in a unrestricted flow tube of the vibratory flowmeter using the vibratory flowmeter and measuring a fluid density ($\rho$) using the vibratory flowmeter, with the method being characterized by:

determining a fluid velocity (V) using the mass flow rate ($\dot{m}$), the fluid density ($\rho$), and a cross-sectional flow area (A);

determining a friction factor (f) using the fluid velocity (V), density ($\rho$), and a pressure drop ($\Delta P$); and determining a compensation factor using the friction factor (f);

providing a pressure sensor in communication with the meter electronics wherein the pressure sensor is separate from the at least one pickoff sensor;

measuring a pressure drop ($\Delta P$) with the pressure sensor; and generating a friction-compensated mass flow rate ($\dot{m}_{comp}$) from the compensation factor.

14. The method of claim 13, wherein the meter electronics of the vibratory flowmeter is configured to receive the pressure drop ($\Delta P$).

15. The method of claim 13, further comprising generating a friction-compensated volume flow rate ($\dot{V}_{comp}$).

16. The method of claim 13, with determining the compensation factor comprising correlating the friction factor (f) to empirically-derived data.

\* \* \* \* \*

UNITED STATES PATENT AND TRADEMARK OFFICE
CERTIFICATE OF CORRECTION

PATENT NO. : 9,689,735 B2
APPLICATION NO. : 13/509870
DATED : June 27, 2017
INVENTOR(S) : Anthony William Pankratz and Joel Weinstein It is certified that error appears in the above-identified patent and that said Letters Patent is hereby corrected as shown below:

In the Specification

Column 4, Line 39, replace "among other things The" with --among other things. The--

Column 5, Line 65, replace "W and the pressure" with --(f) and the pressure--

Column 7, Line 20, replace "friction factor W." with --friction factor (f).--

Column 8, Lines 20 and 40, replace "friction factor W" with --friction factor (f)--

Column 9, Lines 4 and 59, replace "friction factor W" with --friction factor (f)--

Signed and Sealed this
Fifteenth Day of May, 2018

Andrei Iancu
*Director of the United States Patent and Trademark Office*